United States Patent [19]
Sandei

[11] Patent Number: 5,901,539
[45] Date of Patent: May 11, 1999

[54] TOMATO HARVESTER, WITH DEVICES FOR THE AUTOMATIC DISPLACEMENT OF THE HARVEST CONTAINERS

[75] Inventor: Luigi Sandei, Collecchio, Italy

[73] Assignee: FMC Corporation, Chicago, Ill.

[21] Appl. No.: 08/838,966

[22] Filed: Apr. 23, 1997

[30] Foreign Application Priority Data

Apr. 29, 1996 [IT] Italy .................................. PC96A0012

[51] Int. Cl.⁶ ........................ A01D 67/00; A01D 90/00; B65B 67/00
[52] U.S. Cl. ............................................. 56/327.1; 53/391
[58] Field of Search ............................. 53/391, 390, 247, 53/475, 448, 250, 251; 414/331, 501, 508, 788.7, 789.7, 797.5; 56/327.1, 328.1; 221/221, 223, 268, 272, 289, 290, 292, 293, 297

[56] References Cited

U.S. PATENT DOCUMENTS

| | | |
|---|---|---|
| 3,633,336 | 1/1972 | Rempel ...................................... 53/391 |
| 4,570,426 | 2/1986 | Bettencourt et al. ................... 56/327.1 |
| 4,616,468 | 10/1986 | Munoz ................................ 56/327.1 X |
| 4,899,527 | 2/1990 | van den Munckhof et al. .. 56/327.1 X |
| 5,218,812 | 6/1993 | Ventura et al. ............................ 53/391 |
| 5,457,933 | 10/1995 | LaVars et al. ............................. 53/247 |

*Primary Examiner*—Thomas B. Will
*Assistant Examiner*—Robert Pezzuto
*Attorney, Agent, or Firm*—Michael C. Penn

[57] ABSTRACT

A machine for harvesting tomatoes including devices for the automatic displacement of harvest containers having a conveyor for collecting stacks of containers and directing them toward a displacing device, which device removes the bottom one of the leading stack of containers and transports it to a loading device. The loading device uses a pincer to hold the container and move it between a filling position adjacent the harvested-tomato discharge belt and a lowered position in which it is adjacent to or rests on the ground.

14 Claims, 11 Drawing Sheets

FIG_1

FIG_3

FIG_6

FIG_9

FIG_10

FIG._11

FIG_12

FIG_14

TOMATO HARVESTER, WITH DEVICES FOR THE AUTOMATIC DISPLACEMENT OF THE HARVEST CONTAINERS

BACKGROUND OF THE INVENTION

The present invention proposes a machine for harvesting tomatoes (a tomato harvester), in which there are provided devices for the automatic displacement of the containers for the harvested product.

More especially, the harvester according to the invention is provided with a conveyor, on which the containers are deposited in stacks of 4 or more each, and which carries the stacks to a position in correspondence with equipment located on the rear part of the machine, where there are present means that take up the containers, lift them so that they come in correspondence with the devices that discharge the harvested product and that, when these containers are filled, and put them down onto the ground in stacks of two containers.

In this way, the personnel are relieved from this heavy work, one person being sufficient who, with the help of a truck or fork-lift, loads the stacks of containers in the front part of the machine, while all of the successive maneuvers are performed completely automatically.

The past few years have seen a great spreading of tomato harvesting machines, capable of cutting the plants, of separating the fruit from the leaves and branches, and then of directing the tomatoes that have been separated from the rest toward a conveyor belt that in turn discharges them into the harvest containers. These machines provide for a support surface on which there are deposited containers, called "bins", that are taken up one by one by the worker, positioned under the discharge belt, and then deposited on the ground once they are full. This is an operation that proves especially tiring and that uses personnel in a non productive manner, since the operators spend the major part of their time waiting for the containers or bins to be filled, prior to discharging them to the ground.

The Italian Utility Model application No. PC94U000003 of the Applicant describes a tomato harvesting machine to which there is applied a pallet-removing device capable of receiving a couple of these containers to deposit them on the ground when actuated by the operator. This is a rather advantageous solution, that eliminates the most tiring part of the work, but that still requires, however, the intervention of at least one person.

SUMMARY OF THE INVENTION

It is an object of the invention to provide a means for automatically executing the movement of these containers, taking them up from a storage point, carrying them to the filling zone and then depositing them to the ground in a completely automated manner.

To that end, the present invention proposes a machine for the harvesting of fruits, such as tomatoes, comprising handling devices that comprise a conveyor capable of receiving the bins arranged in stacks, separation devices, means for moving each stack to a place in correspondence with the separating devices that take up one container at a time and move it to under a belt that discharges the harvested products, and finally means for depositing to the ground stacks of two filled containers, all this while the machine is moving forward.

BRIEF DESCRIPTION OF THE DRAWINGS

The present invention will now be described in detail, as an example that is not limitative, with reference to the attached figures in which.

DESCRIPTION OF THE PREFERRED EMBODIMENTS

Figure 1:
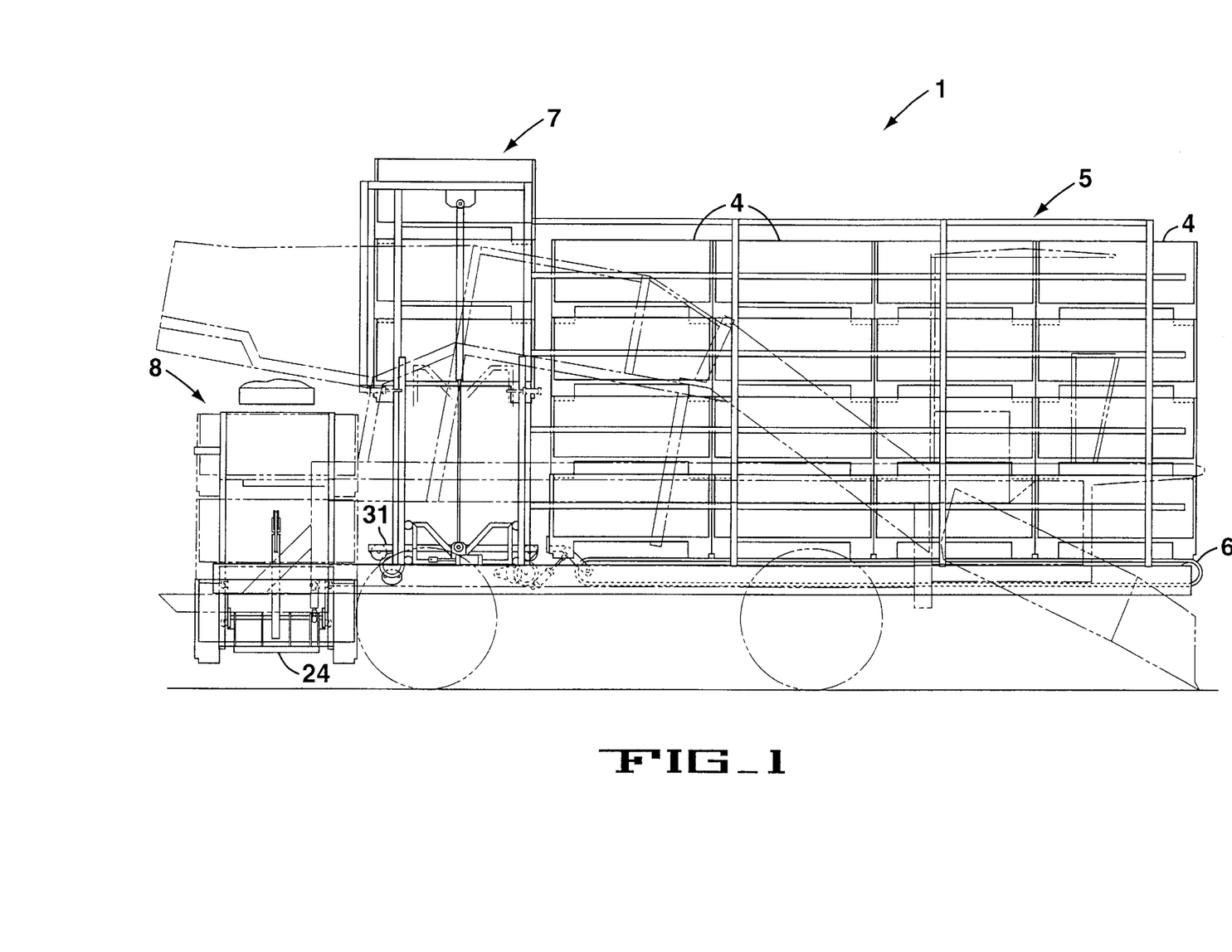
FIG. 1 is a side view of a harvesting machine with the devices for the feeding of containers, according to the invention.
Figure 2:
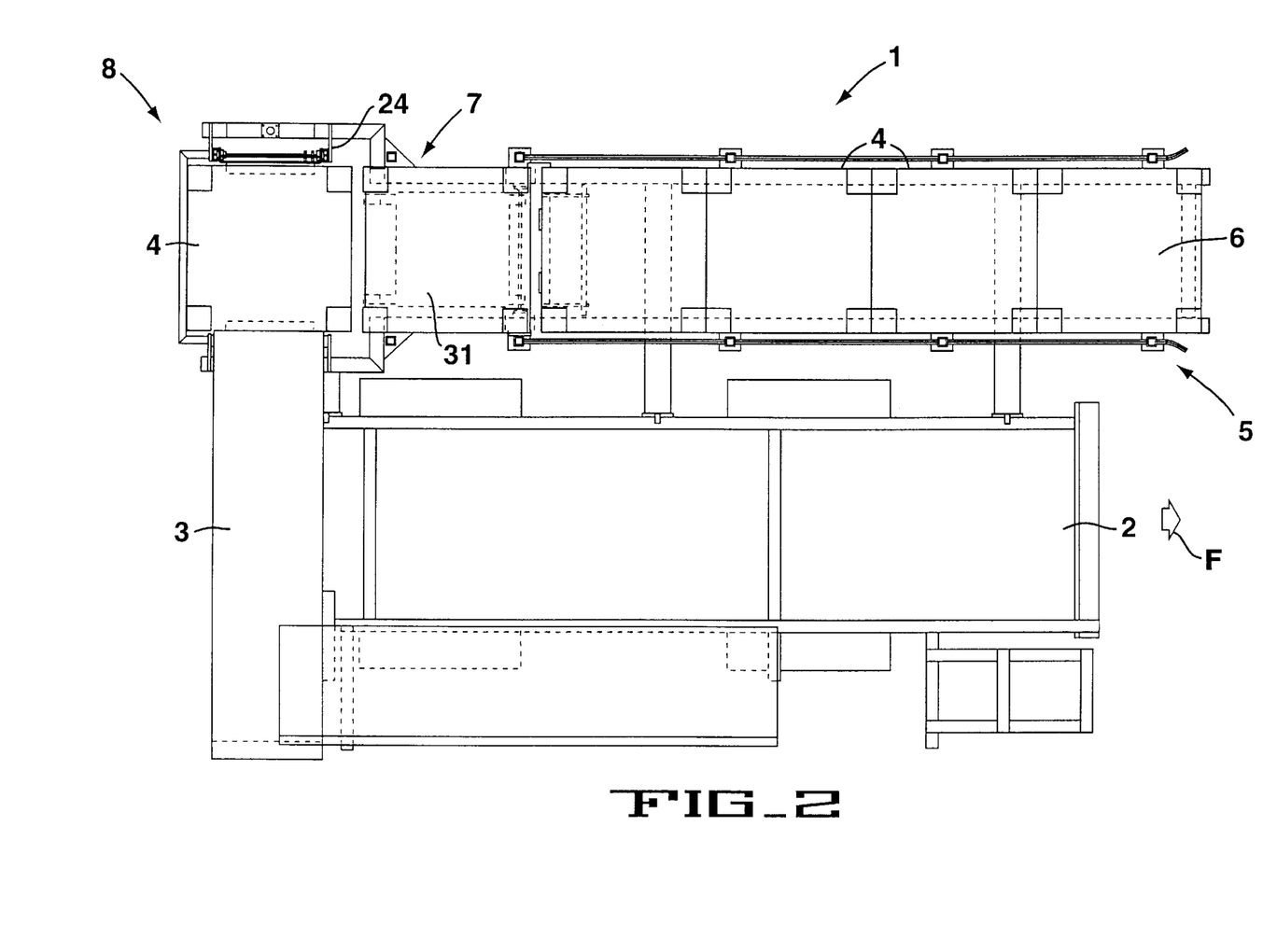
FIG. 2 is a top view of the harvesting machine shown in FIG. 1.
Figure 3:
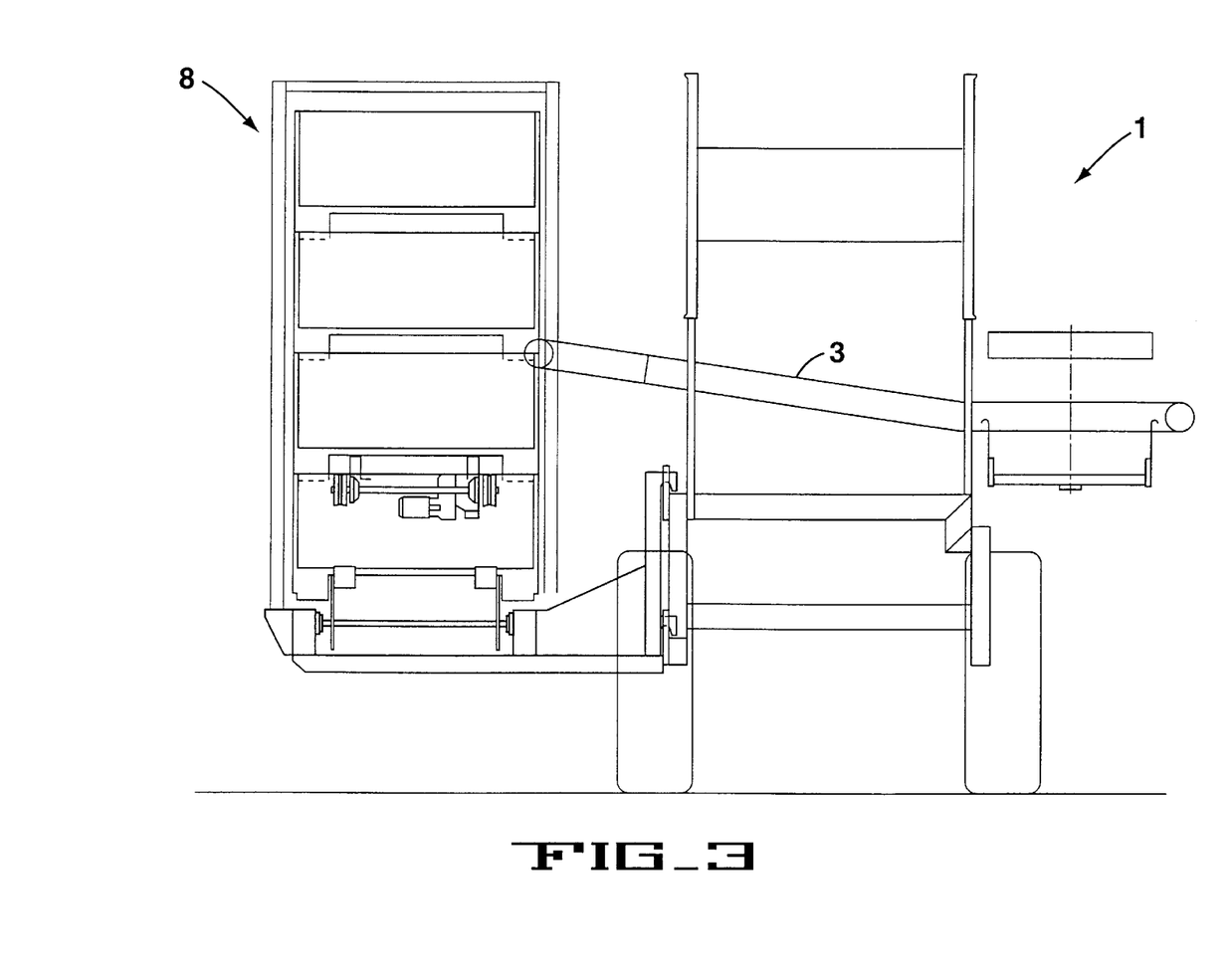
FIG. 3 is an end view of the harvesting machine shown in FIG. 1.

With reference to FIGS. 1 to 3, a tomato harvester 1 moves in a forward direction indicated by arrow F (shown in FIG. 2) and is provided with a mowing bar (not shown) to cut off the plants that then fall on a collecting device 2, that separate the fruit from the plants and direct it toward a fruit conveyor belt 3 that, in turn, discharges it into harvest containers (bins) 4.

To the machine there is affixed a harvest container control device 5, that comprises a stack conveyor 6 on which there are deposited stacks of containers, which in this embodiment each stack comprises four of these containers, and that moves the stacks; and a harvest container separation unit 7 in which there are means that lift all of the harvest containers with the exception of the lowest one; and a filling and discharge unit 8, that receives the lowest harvest container from the separation unit and carries it up, to below the fruit conveyor belt 3 and then lowers it little by little as it fills up, and then deposits it to the ground at the right moment.

The particulars of all of these apparatuses are described in more detail below.

The stack conveyor 6, on which the stacks of harvest containers 4 are deposited by means of a forklift 9 (FIG. 11), is made up of a couple of chains 12 that are supported on guides 13 connected to the frame of the machine. The stack conveyor 6 conveys the stacks towards the harvester container separation unit 7 and the filling and discharge unit 8.

From the stack conveyor 6, the stacks of containers pass onto an intermediate conveyor 31 which forms part of the harvest container separation unit 7, as shown in FIGS. 1 and 2.

The harvester container separation unit 7 comprises, (see FIGS. 4 to 6), a support platform 15 positioned between the guides 13 and under the harvest containers 4, and a riser structure 16 along which there is guided in a sliding structure 17 that holds the support platform 15.

Figure 4:
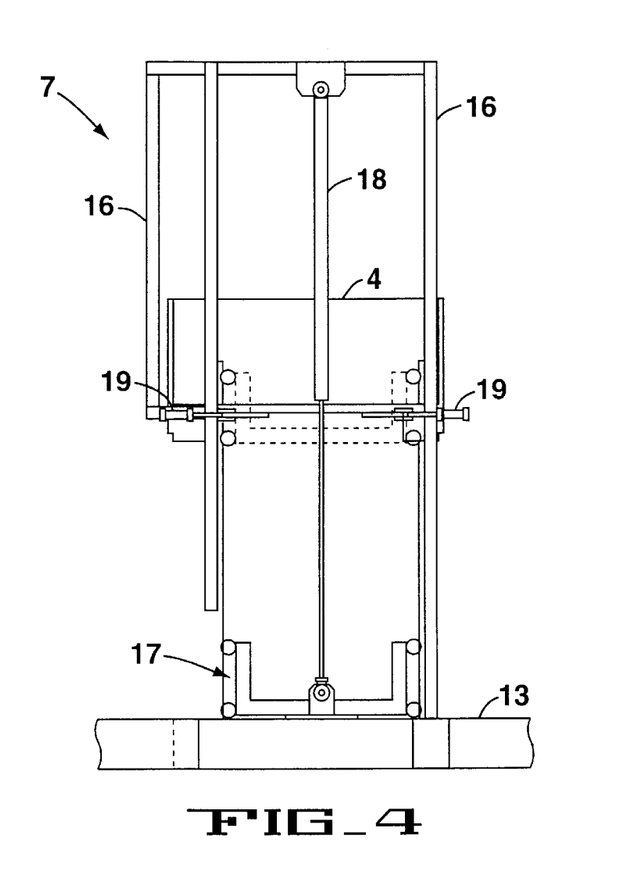
FIG. 4 is a side view of a container separating device used in the harvester shown in FIG. 1.
Figure 5:
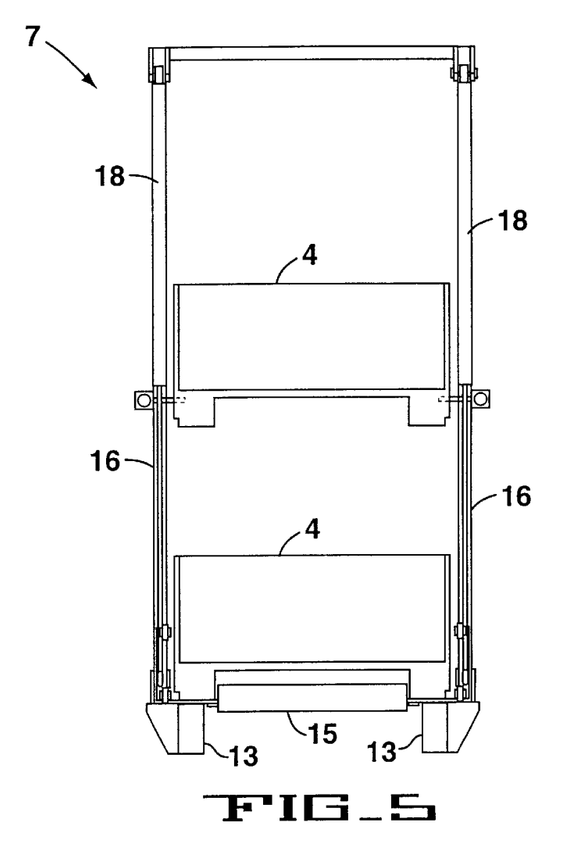
FIG. 5 is a front view of the container separating device shown in FIG. 4.
Figure 6:
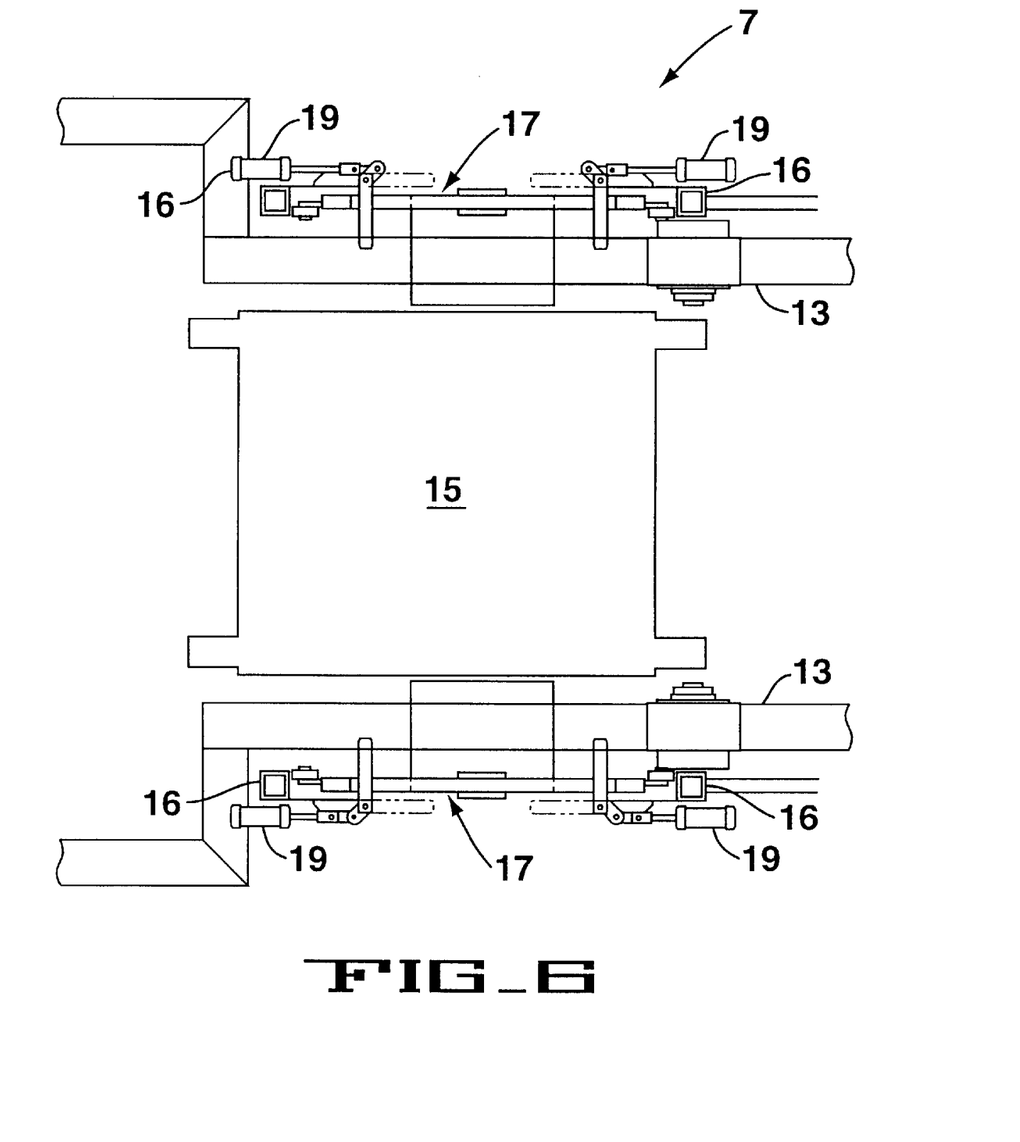
FIG. 6 is a top view of the container separating device shown in FIG. 4.

Platform pistons 18 lift the support platform 15 with the stack of harvest containers 4. The harvest containers 4 are engaged, at a certain height, by arms 19 actuated so as to insert themselves under the harvest containers 4 to hold them at the height reached.

The container separation unit 7 acts as separating device to release the lowest harvest container 4 of the stack, which then can be moved forward toward the filling and discharge unit 8.

In short, when a stack of four harvest containers 4 reaches the support platform 15, the platform pistons 18 are actuated, lifting the entire complex up to a position where the base of a second lowest harvest container is at the height of the arms 19.

The arms 19 are then actuated and become inserted under the second lowest harvest container that is then maintained at the height reached, together with the other harvest containers located above the second lowest harvest container.

The support platform 15 then moves down, thus bringing down and separating from the others the lowest harvest container of the stack, so that the lowest harvest container can then be moved toward the filling and discharge unit 8.

Figure 10:
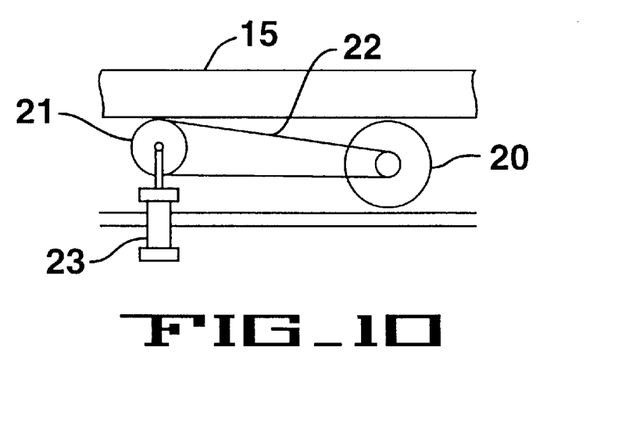
FIG. 10 is the view of a container moving device used in the harvester illustrated in FIG. 1

To that end there is provided a moving unit, as shown in FIG. 10, constituted by a motor 20 that sets into rotation a couple of rollers 21 mounted on a motor support 22 hinged to the frame of the machine. The rollers 21 are subject to the action of the roller pistons 23 that push rollers 21 upward to press the rollers 21 against a lower surface of the support platform 15.

In this manner, by action on the roller pistons 23, the rollers 21 are made to engage the support platform 15 that is pushed forward, moving the lowest harvester container to a point in correspondence with the filling and discharge unit 8.

The filling and discharge unit comprises, (see FIGS. 7 to 9) pincers 24, actuated by the pincer pistons 25, that come and insert themselves under the harvest container 4.

Figure 7:
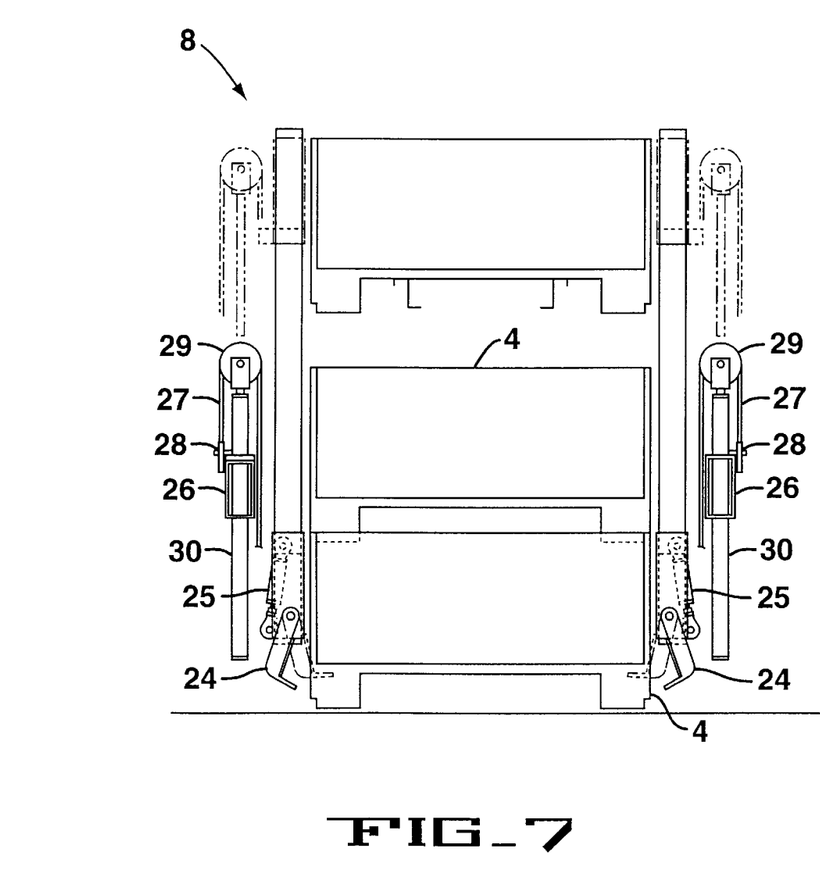
FIG. 7 is an end view of a device for discharging the full containers to the ground used in the harvester illustrated in FIG. 1.
Figure 8:
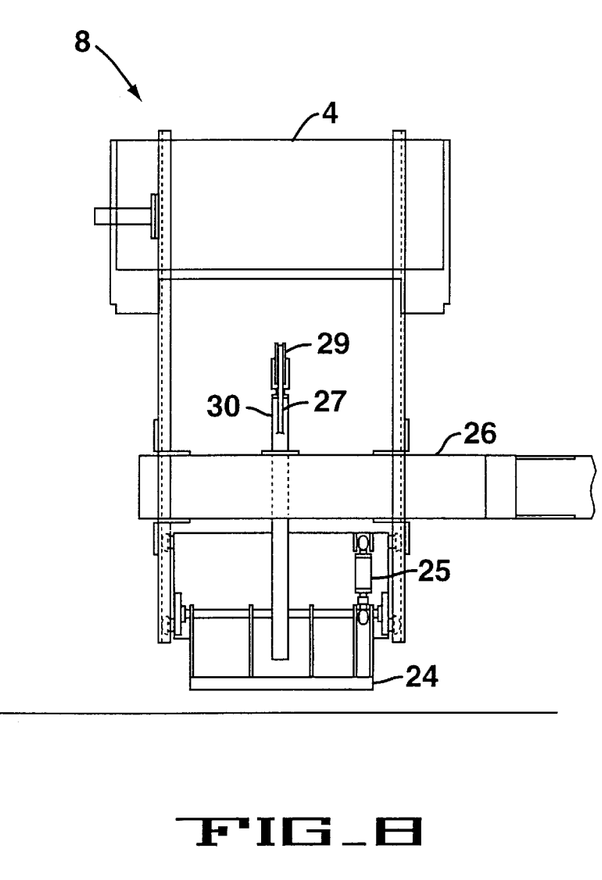
FIG. 8 is a side view of the device shown in FIG. 7.
Figure 9:
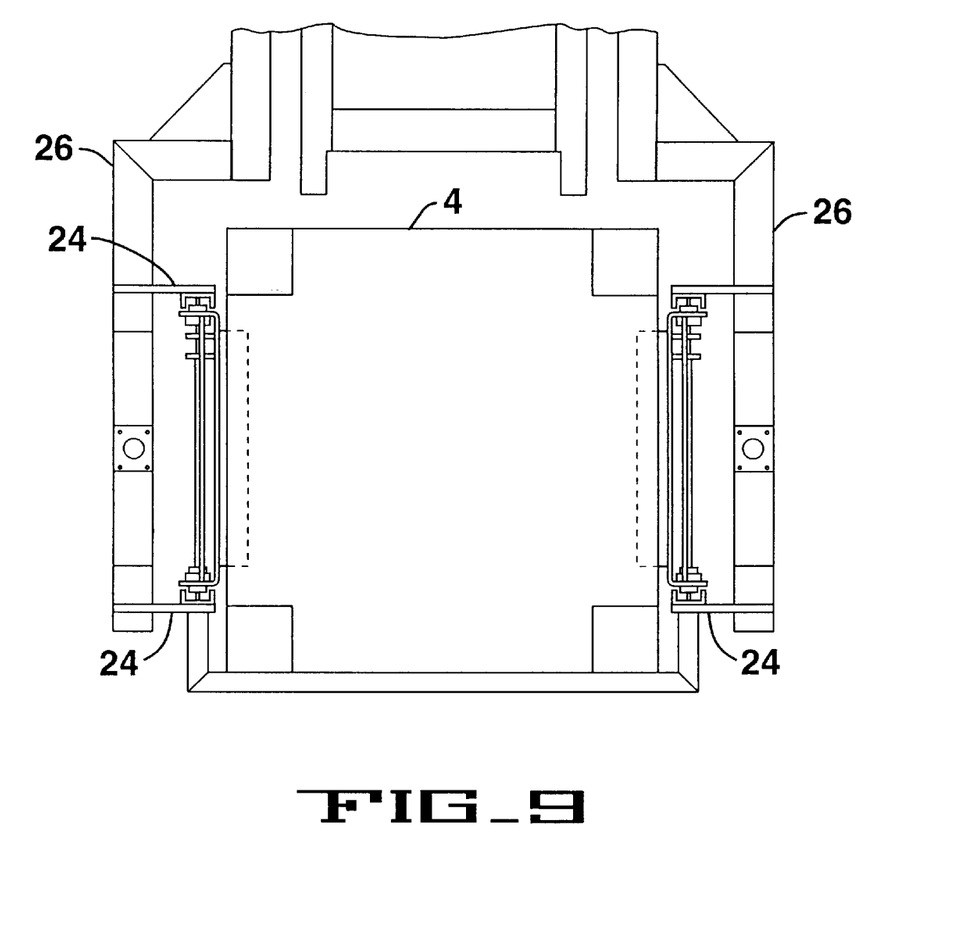
FIG. 9 is a top view of the device shown in FIG. 7.

The pincers 24 are mounted on pincer guides 26 to which there is affixed the end of a lifting chain 27 at a guide chain anchor 28. The other end of the lifting chain 27 is connected to the fixed structure of the machine, and the lifting chain 27 runs over a lifting chain pulley 29 that is pushed upward by a lifting chain piston 30.

When the harvest container 4 reaches this zone, it is gripped by the pincers 24 that are then raised to lift the harvest container to a point immediately under the fruit conveyor belt 3.

While the harvest container 4 is being filled with the product, the lifting chain piston 30 is recalled, thus slowly moving the harvest container 4 downward.

The harvest container separation unit 7 deposits the next harvest container 4 on the support platform 15 and then lifts the remaining two harvest containers. When the harvest container 4 has reached its planned quota, support platform 15 is again actuated The harvest container 4, provided by the harvest container separation unit 7, is then pushed into the filling and discharge unit 8 and deposited on top of the already filled preceding harvest container.

Lifting chain piston 30 is again actuated to lift the second harvest container until it is close to the fruit conveyor belt 3. The fruit conveyor belt 3 continues filling this latter container also.

When both harvest containers 4 are full, the pincers 24 are lowered to deposit on the ground the two full harvest containers 4 and then the pincers 24 open up, leaving the filled harvest containers 4 on the ground.

The operation is as follows:

While the tomato harvester 1 moves forward in the field, an operator, by means of the fork-lift 9, loads the stacks of harvest containers 4, depositing them on the chains 12 of the stack conveyor 6 that carries the stacks toward the rear end of the machine, where harvest container separation unit 7 and the filling and discharge unit 8 are located.

Figure 11:
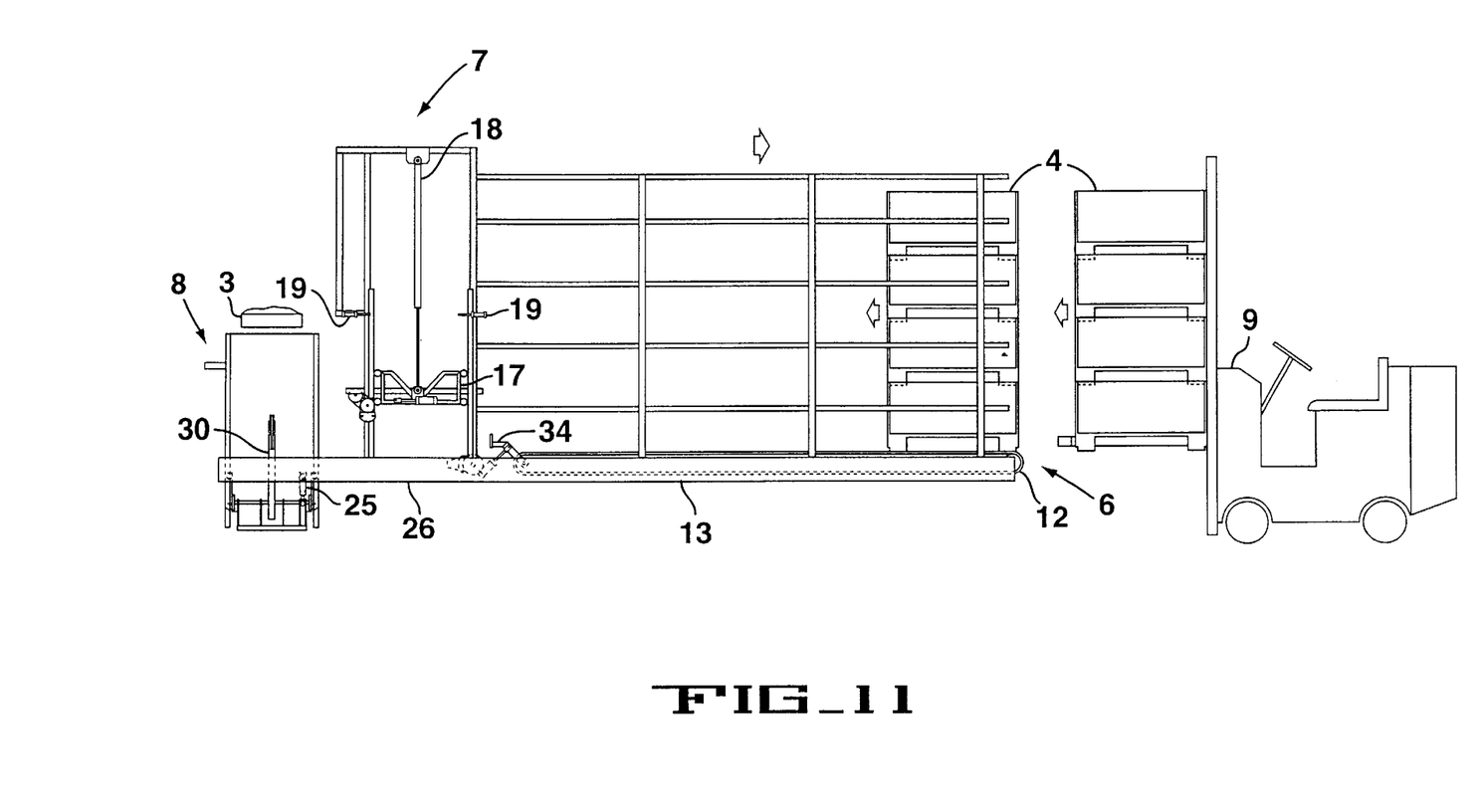
FIGS. 11, 12, 13 and 14 are schematic illustrations of the operation of the harvester illustrated in FIG. 1

A blocking device 34, of any known type, and shown in FIG. 11, stops the forward motion of the stacks of harvest containers.

When it is necessary to feed the containers, the operator releases the blocking device 34 and the first stack of harvest containers moves forward into the harvest container separation unit 7 onto the support platform 15.

The platform piston 18 is then actuated, which lifts the support platform 15 with the entire first stack of harvest containers until the base of the second harvest container from the bottom finds itself in correspondence with the arms 19.

Figure 12:
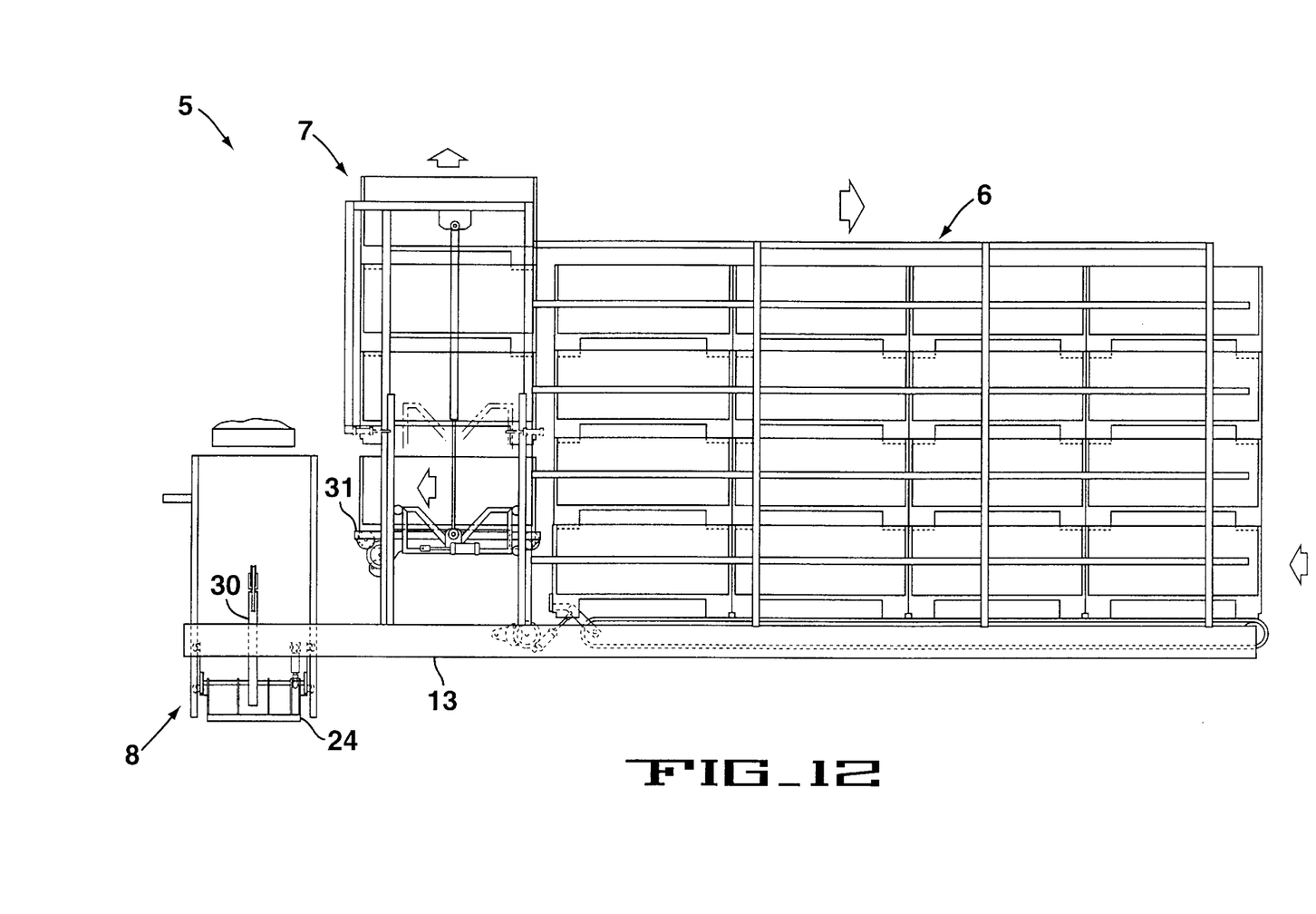

The arms 19 are then actuated to come and insert themselves under the second harvest container from the bottom, to block the entire remainder of the first stack of harvest containers at the height reached, with the lowest harvest container going back down with the support platform 15, which is moved to its starting position by the platform piston 18, as shown in FIG. 12.

Now the motor 20 and the roller pistons 23 are actuated, to set into rotation the rollers 21 and push the rollers 21 into contact with the lower movable part of the support platform 15, which moves the lowest harvest container forward and directs it toward the filling and discharge unit 8.

Figure 13:
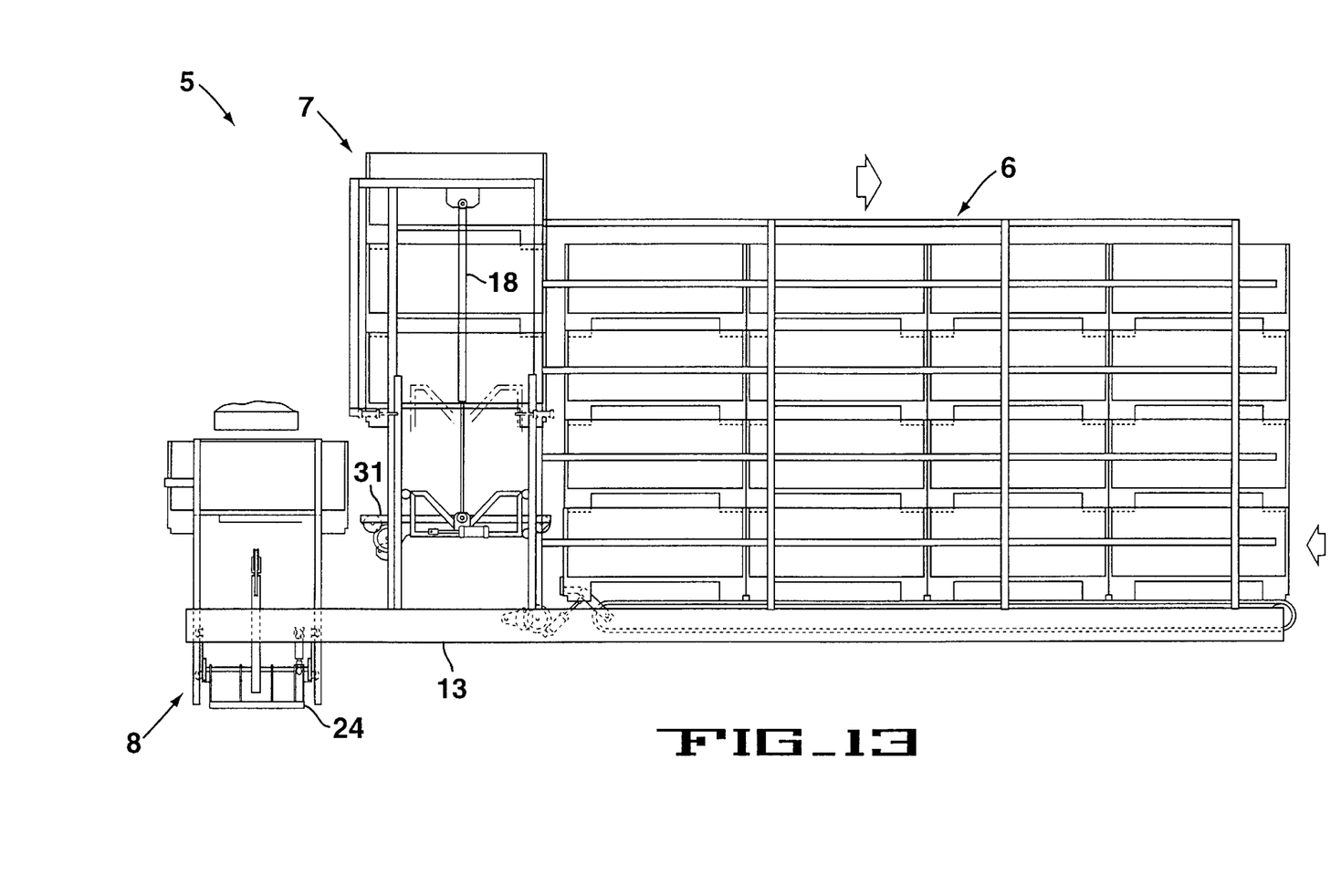

There the lowest harvest container is engaged by the pincers 24, which lift the lowest harvest container to the fruit conveyor belt 3, while the support platform 15 returns to its starting position, as shown in FIG. 13.

While the lowest harvest container is being filled, the platform piston 18 is again recalled upward so as to engage the bottom of the new lowest harvest container, which was the second lowest harvest container of the stack.

The arms 19 are then released. The support platform 15 is lowered by a distance equal to the height of a harvest container, and again the arms 19 are actuated to engage the bottom of the following harvest container.

The new lowest harvest container on the support platform 15 moves downward, to be quickly directed toward the filling and discharge unit 8.

Once the filling of the lowest harvest container is completed, the lowest harvest container is lowered and the support platform 15 is actuated to push into the filling and discharging unit 8 the new lowest harvest container to a position on top of the lowest harvest container.

The lifting chain piston 30 is again actuated, and sends back upward the pincers 24 to hold the previously filled lowest harvest container and the empty new lowest harvest container that is on top of the filled lowest harvest container.

Figure 14:
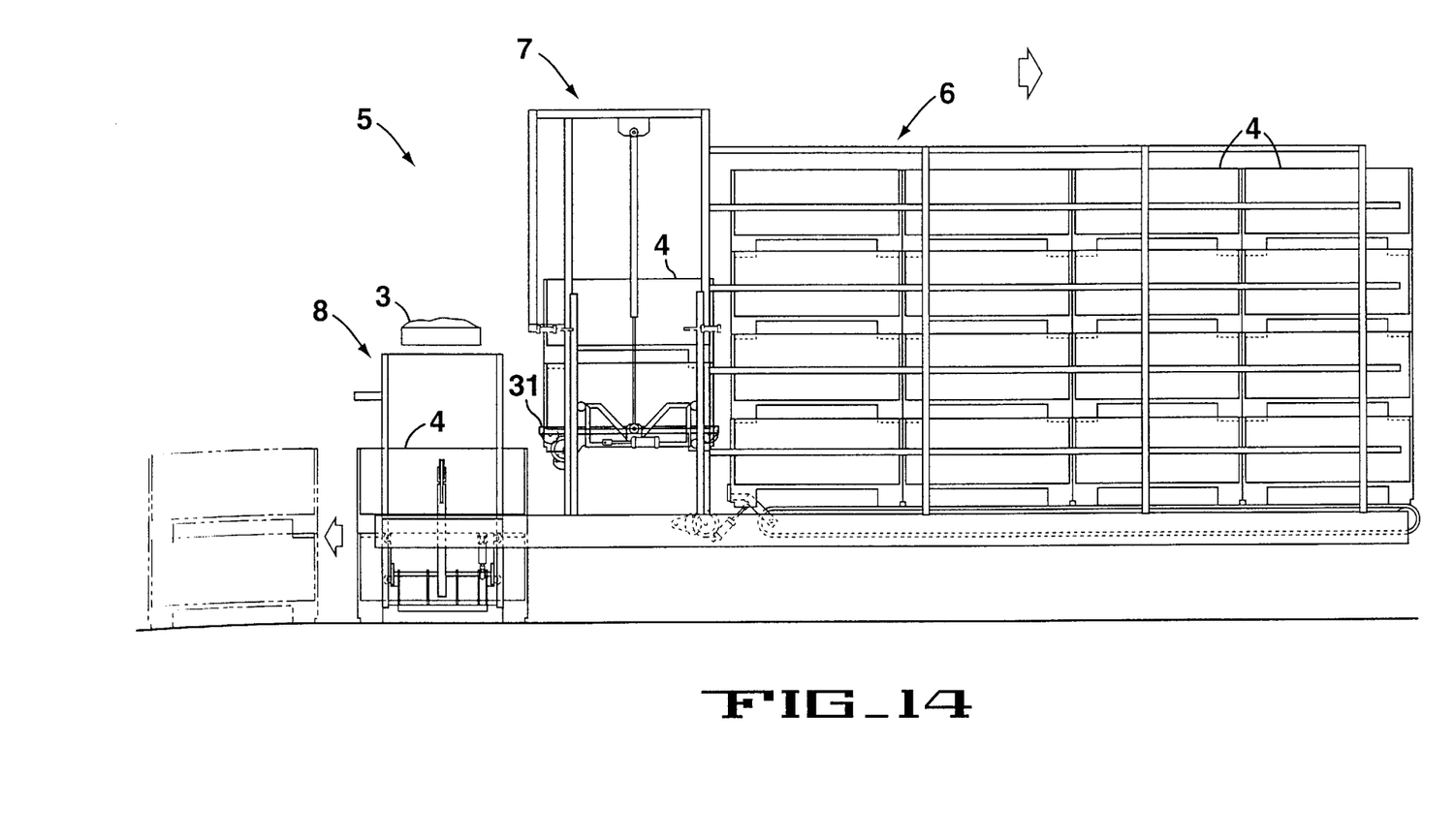

This is continued until the new lowest harvest container is full, after which the pincers 24 are lowered to the ground and opened, to discharge the two harvest containers full of tomatoes, as shown in FIG. 14.

All of the functions described can easily be controlled by the same operator who, on the machine, verifies the correct functioning of the harvesting devices, or it is also possible to provide simple automatic systems, known in themselves, to execute automatically the displacement of the containers.

While preferred embodiment of the present invention has been shown and described herein, it will be appreciated that various changes and modifications may be made therein without departing from the spirit of the invention as defined by the scope of the appended claims.

What is claimed is:

1. An apparatus for harvesting of fruit from plants and placing the fruit into stacks of containers, comprising:
   a collecting device for collecting the fruit separated from the plants;
   a fruit conveyor belt adjacent to said collecting device to catch fruit discharged from said collecting device;
   a stack conveyor supported by said apparatus for moving said stacks of containers;
   a container separation unit for separating a single container from said stack of containers adjacent to said stack conveyor;
   a filling unit arranged to receive said single container from said container separation unit and position said single container to receive, until filled, fruit discharged from said fruit conveyor belt; and
   a stacker for stacking at least two filled containers and discharging the same from said apparatus.

2. The apparatus according to claim 1, wherein said container separation unit comprises:
   a lifting device for lifting and holding the upper containers of said stack;
   a lowering device for lowering the lowest container in said stack; and
   a conveyor for moving said lowest container to a position adjacent said filling unit.

3. The apparatus according to claim 1, wherein said container separation unit comprises:
   a platform to support said stack of containers;
   a plurality of guides adjacent to said platform for guiding said platform in a substantially vertical direction;
   a platform piston mechanically connected to said platform; and
   means for holding the upper containers of said stack from vertical movement while permitting the lower-most container in said stack to move downward with the platform as said piston is retracted.

4. The apparatus according to claim 3, wherein said means for holding comprises a plurality of arms that are selectively moveable under said upper containers to support the same.

5. The apparatus according to claim 4, wherein said container separation unit further comprises:
   a sliding chassis mounted on said platform;
   a drive wheel mounted on said platform; and
   means to bring said drive wheel into engagement with said chassis to move the same toward said filling unit.

6. The apparatus according to claim 5, wherein said filling unit comprises:
   pincers arranged to engage a container, and
   pincer guides to guide said pincers in a substantially vertical direction.

7. The apparatus according to claim 6, wherein said filling unit further comprises:
   a pulley;
   a pulley piston mounted to said pulley; and
   a chain fastened to said pincers and passing over said pulley.

8. The apparatus according to claim 6, wherein said filling unit further comprises:
   a pulley;
   a pulley piston mounted to said pulley; and
   a chain fastened to said pincers and passing over said pulley.

9. A method of harvesting fruit from plants and placing the fruit into stacks of containers comprising the steps of:
   providing an apparatus for harvesting of fruits from plants and placing the fruit into said stacks of containers, comprising:
      a collecting device for collecting the fruit separated from the plants;
      a fruit conveyor belt adjacent to said collecting device to catch fruit discharged from said collecting device;
      a stack conveyor supported by said apparatus for moving the stacks of containers;
      a container separation unit for separating a single container from said stack of containers adjacent to said stack conveyor;
      a filling unit arranged to receive said single container from said container separation unit and position said single container to receive fruit discharged from said fruit conveyor belt until said single container is full; and
      a stacker for stacking at least two filled containers and discharging the same from said apparatus;
   collecting the fruit from the plants;
   moving the stacks of containers to the separation unit;
   separating one container from said stack of containers;
   filling the one container from the stack of containers;
   lowering said one container when filled;
   separating a second container from said stack of containers;
   filling said second container with fruit; and
   stacking said second container on top of said one container.

10. The method according to claim 9, wherein the step of separating comprises the steps of:
   lifting said stack of containers;
   holding part of said stack of containers in a raised position;
   lowering the bottom container of the stack of containers; and conveying the bottom container to a location to permit filling of the bottom container.

11. An apparatus attachable to a fruit harvester which permits the placement of fruit collected by said harvester into stacks of containers, comprising:
   a conveyor for moving a stack of containers;
   means for attaching said conveyor to said harvester;
   a container separation unit positioned adjacent and mechanically connected to said conveyor; and
   a filling and discharge unit adjacent and mechanically connected to said container separation unit;
   wherein said container separation unit comprises
      a platform to support a stack of containers;
      a plurality of guides adjacent said platform for guiding said platform in a substantially vertical direction;
      a platform piston mechanically connected to said platform; and
      means for holding the upper containers of said stack of containers at a height while permitting the lower-most container of said stack to go down with said platform.

12. The apparatus according to claim 11, wherein said means for holding comprises a plurality of arms that are selectively moveable under said upper containers to support the same.

13. The apparatus according to claim 12, wherein said container separation unit further comprises:
  a sliding chassis mounted on said platform;
  a drive wheel mounted on said platform; and
  means to bring said drive wheel into engagement with said chassis to move the same toward said filling and discharge unit.

14. The apparatus according to claim 13, wherein said filling and discharge unit comprises:
  pincers arranged to engage a container, and
  pincer guides to guide said pincers in a substantially vertical direction.

* * * * *